June 9, 1964  A. S. ESCOBOSA  3,136,224

DUAL FLOW-SYNCHRONIZED ELECTRO-HYDRAULIC SERVO

Filed Nov. 4, 1960  2 Sheets-Sheet 1

*INVENTOR.*
ALFONSO S. ESCOBOSA

BY Edward A. Lohoski

AGENT

June 9, 1964    A. S. ESCOBOSA    3,136,224
DUAL FLOW-SYNCHRONIZED ELECTRO-HYDRAULIC SERVO
Filed Nov. 4, 1960    2 Sheets-Sheet 2

INVENTOR.
ALFONSO S. ESCOBOSA
BY
Edward A. Sokolski
AGENT

United States Patent Office 3,136,224
Patented June 9, 1964

3,136,224
DUAL FLOW-SYNCHRONIZED ELECTRO-HYDRAULIC SERVO
Alfonso S. Escobosa, Long Beach, Calif., assignor to North American Aviation, Inc.
Filed Nov. 4, 1960, Ser. No. 67,323
19 Claims. (Cl. 91—363)

This invention relates to hydraulic servo systems and more particularly to a dual tandem system which provides protection against partial failure.

Present piloted aircraft control systems, as distinguished from fully automatic missile systems, employ flight stability augmenter systems in conjunction with the pilot's flight controls for achieving a combined or net control signal to the control surface actuators. An essential feature of present and future aircraft requiring stability augmentation is a safe airframe response to a failure within the stability augmentation system. In such a system, servo failure may be such as to provide either zero or maximum output for any given input. The latter type of failure, which may be termed "hard over" failure, is most troublesome since it may prevent control by an alternate or manual system. One compromise means for accomplishing a fail-safe feature in the stability augmentation system has been to limit the authority of the stability augmentation actuator system. Thus, in the event of a system failure resulting in a hardover command the resultant motion of the primary flight control surface is nominal. The disadvantage of such limited authority is the limited effectiveness and hence limited utility of the stability augmenter even when it is operable and functioning properly.

Another means by which the feature of fail safety may be realized is by dualing the stability augmentation system or providing a combination of two control channels for achieving a given control output, in such a manner that the effect of a failure in one channel is reduced to a safe value by the second channel. Such a system is known as a dual, fail-safe system. In a flight stability augmenter system, for instance, the concept of a dual system or system redundancy can be carried out to the extent or degree desired to include not only the actuator device, but also the input systems to the actuator, including the system sensors and the sensor signal equalizing channels, as well as the input channels to the actuator. However, the success of such schemes for redundancy require a reliable actuator servo system.

In an electro-hydraulic servo system, generally the combination of control channels to achieve a dual system is accomplished by means of a dual tandem actuator, electrohydraulic transfer valves connected to each half of the dual tandem actuator, and a synchronizing system connected to sense and reduce unbalances in the actuator control chambers. Other units related to the stability augmenter servo and essential to the fail-safe function of the overall stability augmenter system are a failure monitor, a hydraulic power-cutoff device controlled by the failure monitor, and a self-energized centering actuator which centers the dual tandem actuator in the event the hydraulic power to such actuator is cut off. However, this disclosure is concerned with a dual-tandem actuator system of this general type and, more particularly, with a dual channel electrohydraulic servo in which the two channels are flow-synchronized to compensate for performance differences existing in one channel relative to the other. Accordingly, it is an object of this invention to provide an actuator system in which, while either failure or malfunction is a recognized possibility, the disadvantageous effects of failure or malfunction are minimized and increased flight safety is achieved.

Present dual tandem actuator devices impose serious weight reliability, and performance penalties on the overall stability augmentation system in which they are employed. Specifically, the following major shortcomings are manifest: Elaborate schemes are required for proper assembly of dual tandem actuator components. The inherently great length of such dual tandem actuators makes it generally necessary to mount the associated centering actuator parallel to the dual tandem actuator structure, thus requiring a tie-bar between the shafts of the two actuators which causes side loading between those shafts. Further, the dynamic response characteristics of such actuators vary with temperature and the magnitude of the hydraulic power stage unbalance, with the result that the desired dynamic characteristics are not maintained, and, at best, are the nominal of the expected variations.

In dual actuators which provide pressure synchronization means, several disadvantages are inherent due to reliance upon a pressure transducer. One disadvantage is the decreased accuracy due to the time lag in sensed pressure resulting from the compressibility effects. For instance, there is a time lag between the occurrence of a valve unbalance and the corresponding pressure unbalance due to the compliance or spring-rate of the fluid. Further, this time lag varies with both temperature and valve opening, being negligible for large valve openings, and causing a wide variation in the system dynamics. As a result, the large range of variation in system dynamics makes the attainment of a system performance optimum extremely difficult. Further disadvantages result, depending upon the type of pressure transducer employed. The small excursions associated with a diaphragm type pressure transducer cause difficulty, during manufacture, in maintaining gain tolerances and controlling non-linearities in the output response. The piston seal friction and seal slop associated with spring-loaded piston-type pressure transducers cause hysteresis and poor linearity in a pressure synchronization system using such a transducer.

In carrying out the principles of this invention in accordance with a preferred embodiment thereof, there is provided an actuator servo system embodying a plurality of substantially similar feedback or closed-loop channels each of which includes a fluid power mechanical output device which is operable in response to a driving error signal. The driving error signal in each of the several channels has combined therewith a signal proportional to the time integral of the difference between the fluid flow in each of the several fluid power channels. The output forces of the several individual channels are summed. That is, such channels are arranged to provide a common mechanical output motion of a single common output member from the system, in accordance with the sum of the force outputs of the individual channels acting upon such member.

Dual channel operation is achieved with but a single cylinder and piston by a novel arrangement of a pair of valves such that while one valve controls fluid flow into the cylinder the other controls fluid flow out of the cylinder. The valves, as so driven, cooperatively operate the piston. Two separate control loops are closed around the actuator with one valve in each loop. For purposes of equalizing the flow through both valves there is provided a flow integrator which generates a signal indicative of the time integral of the difference between the fluid flow in each of the valves. This signal is fed into the two closed loops so as to cause an additional component of flow in each which will balance the two flows.

With the above-described arrangement, the common single output of the system will reflect little or none of the effects of a hard-over failure (immediate maximum actuator displacement) of a single channel. Instead, the system merely becomes inoperable within an interval of time during which a monitor system may be used to de-energize the system. In the event of a slow drift in one channel causing a small flow unbalance, the differential flow integrator will cause a compensating or flow balancing signal in such channel and a corresponding flow-balancing signal in the other channel as to reduce the unbalance caused by the drift. The resultant effect upon aircraft attitude due to a slow drift is essentially compensated for or counteracted by the response of the stability augmenter system or guidance loop in which the servo actuator is employed, resulting in a negligible change in aircraft altitude. During normal or balanced system operation, the fluid flow in both channels occurs in unison in response to a common system input, resulting in no change in the output signal from the flow integrator. An object of this invention, therefore, is to increase the reliability of a hydraulic servo actuator system.

Still another object of this invention is to minimize the disadvantageous effects of different types of servo failures.

A further object of this invention is to provide a multiple channel hydraulic servo system wherein the effect of failure of a single channel upon system output will be minimized.

Another object of this invention is to provide a multiple channel hydraulic servo system of inherently short length, minimum size and minimum weight, and being convenient and practical to manufacture.

Still a further object of this invention is to provide a dual channel flow-synchronized hydraulic servo system wherein the dynamic response characteristics are relatively independent of the compliance of the fluid, and of the differential fluid flow magnitude due to asymmetries between the dual channels.

These and other objects of this invention will become apparent from the following description taken in connection with the accompanying drawings in which.

In the drawings, like reference characters refer to like parts.

Figure 1:
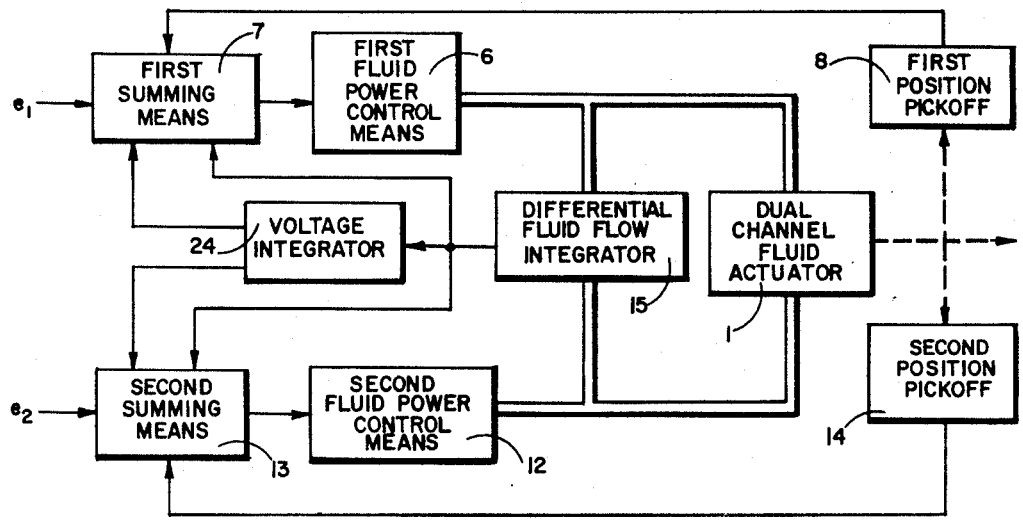
FIG. 1 is a block diagram of a system embodying the principles of this invention.

Referring to FIG. 1, a block diagram of a device embodying the principles of the invention is illustrated. Similar electrical command signals $e_1$ and $e_2$ each corresponding to the desired position output of an hydraulic actuator 1 are fed from an input source (not shown) to each of two summing networks 7 and 13 respectively. in an automatic flight control application, such as stability augmentation, for example, such actuator command signals are generated by the stability augmenter system which constitutes the input source. An electrical signal corresponding to the position output of actuator 1, is generated by each of two position pickoff devices, 8 and 14, and fed to summing networks 7 and 13, respectively. These two feedback signals are of opposite sense relative to the corresponding command signals applied to the summing networks. Hence, the electrical output signal from each summing network constitutes an error driving signal. The error driving signals are fed to a pair of fluid power control means 6 and 12 respectively. The fluid power control means, in response to these driving signals, act cooperatively to communicate fluid power to the fluid actuator 1 causing mechanical output motion of the actuator, resulting in position feedback signals in the pickoff devices which tend to reduce the error driving signals to null and to reduce to zero the fluid power communicated from each of the fluid control means.

A differential fluid flow integrator 15 is connected in fluid circuit between the fluid power control means 6 and 12, to sense the time integral of the difference in fluid flow between the two fluid power control means 6 and 12. The output signal from the fluid flow integrator is fed to each of the two summing networks 7 and 13 and to a voltage integrator 24. The voltage integrator is a conventional integrating amplifier which provides an output signal representing the time integral of the output signal from the flow integrator. The output signal from the voltage integrator is fed to each of the two summing networks 7 and 13.

The output of the flow integrator 15 is connected to both the voltage integrator 24 and the summing networks 7 and 13, with the output of the voltage integrator 24 being connected to the summing networks, as shown in FIG. 1, in order to resist saturation of the flow integrator while avoiding the dynamically destabilizing effect of an additional integrator in series in a servo feedback loop. The polarity or sense of the output signals fed from the flow integrator and voltage integrator is selected to provide negative feedback means for reduction of differential flow as will be more fully explained in a description of the performance of the system.

If the two channels of the dual channel actuator are subjected concurrently to like inputs, and demonstrate like output responses to like inputs and a common operational null point, the two channels are operationally symmetrical. In the presence of such symmetry, no differential input to the flow integrator will occur, and therefore no change in the flow integrator output will result. Further, if the flow integrator is at its null output position, then no input is fed to the voltage integrator and consequently no change results in any output signal maintained by the voltage integrator at the summing networks.

The existence of a performance asymmetry between the two channels may be represented as a failure signal component existing at the power stage of one of the two channels. In the event of a sudden, finite bias type failure in one channel or the occurrence of a sudden, finite unbalance existing between the two channels, the signal from the fluid flow integrator increases with time until the failure signal component is biased or the power stage in the operative channel is compensated or both, whereby the fluid power stages are balanced and the fluid flow in each is synchronized relative to the other. However, dual flow synchronization or full compensation of differential flow will not be accomplished if the flow integrator prematurely saturates due to reaching its signal output limit.

In order to reduce the probability of the flow integrator 15 reaching its signal output limit, the voltage integrator 24 is employed in conjunction with the fluid flow integrator 15. The signal output from the fluid flow integrator 15 is time-integrated by means of the voltage integrator 24 to provide an auxiliary bias signal at the two summing networks 7, 13 of like sense as the fluid flow integrator output, which bias signal consequently results in tending to null or center the fluid flow integrator.

Figure 2:
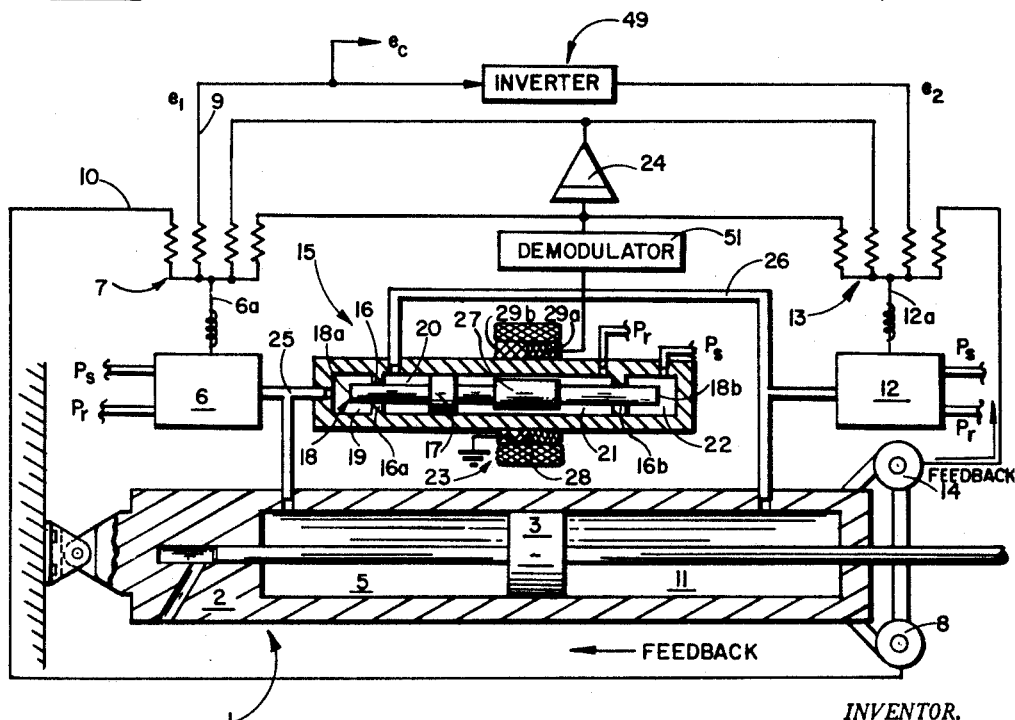
FIG. 2 is an illustration of a preferred embodiment of the invention.

Referring to FIG. 2, a preferred embodiment of the principles of the invention is shown. A dual channel electro-hydraulic actuator system 1 comprises a cylinder 2 reciprocally mounting a movable piston 3 under the control of two electrically operated three-way valves 6 and 12, each of which controls the flow of fluid under pressure to or from one of the two chambers 5 and 11 on either side of the piston in accordance with the polarity of electrical D.-C. valve control signals appearing on leads $6a$ and $12a$. The valves are conventional structures for providing fluid flow from a source of supply pressure $P_s$ or to a return pressure $P_r$. A single conventional servo loop of the dual channel actuator includes a first chamber 5 of the actuator, valve 6, summing network 7, and position pickoff 8. As in conventional servo operation, the summing network 7 receives a command signal on line 9 and also an output position feedback signal on line 10 from position pickoff 8. The pickoff may comprise a conventional potentiometer pickoff mounted with respect to the piston and cylinder whereby the pickoff provides an output voltage proportional to the relative displacement between piston and cylinder. The sense of the feedback signal relative to the sense of the input signal for like directions of motion output is opposed so as to constitute a negative feedback signal. Hence, the driving error signal at the output of the summing network 7, is equal to the algebraic sum of the inputs thereto on lines 9 and 10, neglecting, for the moment, the other summing network inputs. The driving error signal is zero when the output position corresponds with the desired position.

The second channel of the two channel system illustrated in FIG. 2 is substantially identical to the first channel described above and comprises a second chamber 11 of actuator 1, valve 12, summing network 13 and position pickoff 14, all constructed and arranged as are the corresponding elements of the first servo channel, with certain differences to be noted. For a given system command $e_c$, of given sense or direction, the sense of the second channel input, $e_2$, is opposite to that of the first channel input $e_1$. Such phase inversion or polarity reversal may be obtained by any one of a number of means well known in the art and is indicated only schematically in FIG. 2 by element 49. Thus, in response to a system command to move the piston to the right in FIG. 2, valve 6 of the first channel admits fluid under pressure from source $P_s$ into first chamber 5, tending to force the piston to the right, while valve 12 of the second channel allows the pressurized fluid in the second chamber 11 to flow out via the low return pressure valveport, so as to cooperate with the first channel in effecting piston motion to the right. Hence, for sense convention, flow from valve 6 into the first chamber 5 corresponds with flow out of the second chamber 11 toward valve 12.

In order to provide fail-safe operation of the system of FIG. 2, the two channels are interconnected in fluid circuit and electric circuit by means of the fluid flow integrator 15. The fluid flow integrator comprises a cylinder 16 reciprocally mounting a movable piston 17 with a rigidly connected spool 18 extending through and beyond a pair of chambers 20 and 21 which are formed adjacent opposite sides of piston 17 by cylinder transverse partitions 16a and 16b, respectively. A third chamber 19 and a fourth chamber 22 are formed at the ends of the cylinder, each chamber enclosing within its volume the associated terminal cross-sectional area of the piston spool 18, said third chamber being on the same relative side of the piston as the first chamber. The effective hydraulic areas of the spool or piston as presented in each of the four chambers are equal to each other. By means of conduits 25, 26 respectively, the first and third chambers 20, 19 of the fluid flow integrator are each connected in fluid circuit to the output side of respective ones of the two transfer valves 6 and 12, between which the time integral of differential flow is desired. The second and fourth chambers 21, 22 of the flow integrator are connected to a return line $P_r$ and a pressure line $P_s$, respectively, of a closed hydraulic pressure fluid source, which is also a pressure source for the actuator 1. A position pickoff 23 is also included, mounted relative to the fluid flow integrator cylinder 16 and piston 17, to measure the relative motion of the piston 17 which is indicative of the time integral of the fluid flow in the first and third chambers of the integrator:

$$\Delta V = A \Delta l = \int q_d dt \quad (1)$$

Where:

$q_d$ = Flow rate into the flow integrator
$\Delta V$ = Incremental volume
$A$ = Effective hydraulic area
$\Delta l$ = Relative motion of the integrator piston The position pickoff 23 for the particular embodiment shown in FIG. 2 is illustrative only of one of several means by which to measure the relative motion between the fluid flow integrator cylinder 16 and spool. Such illustrative means is an A.-C. inductive pickoff or E-type pickoff, and comprises a magnetically permeable and cylindrical slug 27 mounted upon the spool and situated within the third chamber, a primary winding 28, and secondary winding 29. The windings are externally concentric with and fixed to the flow integrator cylinder 16 about the third chamber, and are concentric with each other. The secondary winding consists of two half-sections 29a, 29b, axially spaced relative to and proximately contiguous with each other, each half-section being oppositely connected in series electrical circuit with the other, such that a common flux change due to A.-C. excitation of the primary coil, for instance, will induce symmetrical and opposing voltages in each half-section relative to the other, resulting in a zero net electrical potential across such secondary winding. In operation, relative changes in flux coupling between each half section and the primary winding occur in response to relative motion of the magnetically permeable slug (and spool) resulting in an induced voltage across the secondary winding which is indicative of the position of spool. The successful use of such illustrated type of pickoff in the embodiment described relies upon the use of a material for the flow integrator cylinder and spool which has relatively low magnetic permeability, while retaining other preferred properties of high strength and ability to be formed to close geometric tolerances. Such a typical material is austenitic stainless steel, Standard Type 303. The use of an A.-C. pickoff for the flow integrator requires the further inclusion of a phase-sensitive demodulator 51, as indicated in FIG. 2, in order to provide suitable D.-C. control signals for the electro-hydraulic valves and the voltage integrator. The use and structure of such phase-sensitive demodulator device is well-known to those skilled in the art.

The control line pressure between each transfer valve 6, 12 and the associated actuator chamber 19, 22 is normally one-half the difference between the supply pressure $P_s$ and the low return pressure $P_r$. Because $P_s$ is very large relative to $P_r$, such line pressure is essentially equal to one-half the supply pressure $P_s$. Therefore, the static force acting to the right in the first and third chambers 19 and 20 of the flow integrator upon the flow integrator piston spool (as shown in FIG. 2) is essentially twice the product of ½ $P_s$ and the effective hydraulic area. This static force is balanced by the opposing force acting to the left in the fourth chamber 21 upon the piston spool, which force is equal to the product of $P_s$ and the effective hydraulic area. The effective hydraulic areas in each chamber being equal, and the pressure $P_r$ in the second chamber being negligible, no motion of the piston spool results except when flow in or out of the first and third chambers occurs. The flow integrator assembly as shown does not employ or require seals between adjacent chambers due to the small radial clearances employed. The absence of seals assures both (1) low threshold operation due to low friction, and (2) simplified means of fabrication. The use of an induction type position pickoff further assures achievement of these objectives.

Spool 18 as shown in FIG. 2 may be constructed alternatively of several longitudinal sections comprising a first spool section 18a rigidly connecting to piston 17 and extending through and beyond cylinder transverse partition 16a a second spool section extending through and beyond the second cylinder transverse partition 16b, and the magnetically permeable cylindrical slug 18c of the pickoff device axially spaced between the first and second spool sections and situate in the third chamber, the three longitudinal pieces being held together as a single unit due to the combined effects the actuator control chamber pressures and the supply and return pressures applied to the flow integrator. The advantages of such a structure are that (1) radial alignment of the entire spool, piston and magnetic slug together with radial alignment of the opening in each of the cylinder traverse partitions through which the sections of the spool extend, is not critical and (2) therefore better allows the use of small radial clearances between the transverse partitions and the spool sections extending through them. A voltage integrator 24 is included in the embodiment shown in FIG. 2, the input of the voltage integrator being connected in electrical circuit to the output of the flow integrator, and the output of voltage integrator being connected to each of the summing networks 7 and 13. The structure of a voltage integrator is a conventional electronic means well understood in the art and is therefore only indicated schematically. The purpose of the voltage integrator is to be more fully appreciated from the after-described operation of the system.

Figure 3:
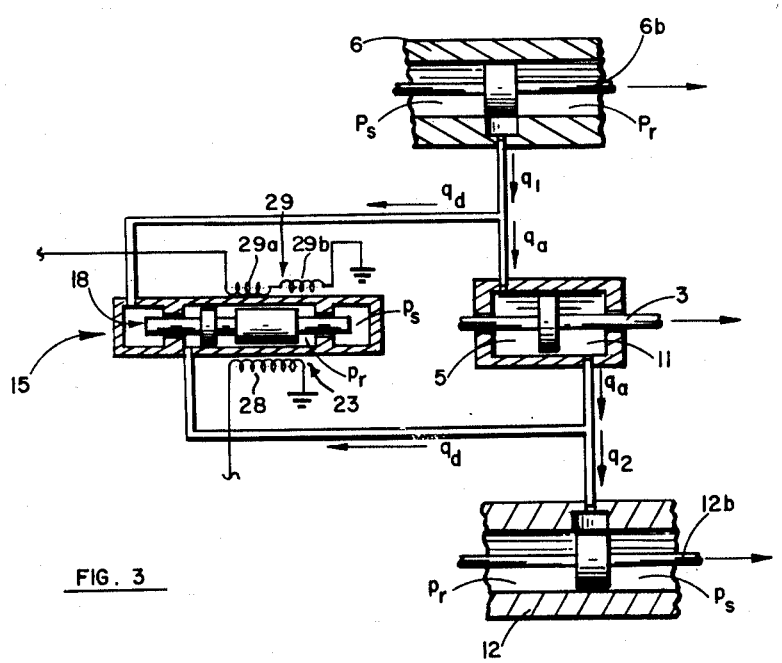
FIG. 3 is a functional schematic of the embodiment of FIG. 2, illustrating certain operational details of a dual channel electro-hydraulic actuator system.

Referring to FIG. 3 for a detailed examination of the operation of the functional fluid circuit of FIG. 2, a schematic shows the cooperation of the dual channel actuator 1, power stage of each of first and second transfer valves 6 and 12, and the fluid flow integrator 15. The components of fluid flow in the fluid circuit shown in FIG. 2 are defined as follows, neglecting compressibility effects:

$q_1$=flow through the first transfer valve 6
$q_2$=flow through the second transfer valve 12
$q_a$=flow into one chamber of actuator 1 and out of the other chamber of said actuator
$q_d$=flow into or out or both chambers 19 and 20 of the flow integrator.

The term $\Delta X_0$ indicates incremental output motion of the actuator 1 in response to a system input signal or command. The directional sense of the arrows indicates for a desired piston motion to the right ($+\Delta X_0$), the associated sense of fluid flow, $q_a$, in the first chamber 5 and out of the second chamber 11 of the actuator 1, and the sense of fluid flow, $q_1$ and $q_2$, associated with the power stage of each of the transfer valves, and the associated sense of transfer valve power spool displacement relative to the supply pressure and return pressure valve ports. The direction of the arrows for the differential fluid flow, $q_d$, indicates the flow sense for an assumed unbalance condition where the magnitude of positive sense flow in valve 6 is larger than that for the associated flow in valve 12. It is to be noted that the sense of $q_d$, differential flow into the flow integrator, represents in the first channel a portion of the flow from the valve 6, and in the second channel a part of the flow out of the cylinder chamber 11.

Employing the above definition of $q_a$, the actuator fluid flow, it is to be seen that $q_a$ is equal to one half of the sum of the flow at both valves 6 and 12.

$$q_a = q_2 + q_d \qquad (2)$$

$$q_a = q_1 - q_d \qquad (3)$$

$$2q_a = q_1 + q_2 \qquad (4)$$

$$q_a = \frac{q_1 + q_2}{2} \qquad (5)$$

Thus, where the flow at each valve is identical to the flow at the other, the flow in the actuator is equal to either one ($q_a = q_1 = q_2$). This condition would also define that the differential flow, $q_d$, is equal to one half the difference between $q_1$ and $q_2$:

$$q_d = q_1 - q_a \qquad (6)$$

$$q_d = -q_2 + q_a \qquad (7)$$

$$2q_d = q_1 - q_2 \qquad (8)$$

$$q_d = \frac{q_1 - q_2}{2} \qquad (9)$$

The significance of these relationships is that for small unbalances and large signal inputs, the differential flow will be less than the actuator flow: $0 < q_d < q_a$; whereas for an open circuit failure in one channel (e.g. zero flow) the magnitude, but not necessarily the sense, of differential fluid flow will equal actuator fluid flow. For instance, let $q_1 = 0$ in the presence of a positive input signal. Then, substituting in the above equations for $q_a$ and $q_d$:

$$q_a = \frac{+q_2}{2} \qquad (10)$$

$$q_d = \frac{-q_2}{2} \qquad (11)$$

$$|q_d| = |q_a| \qquad (12)$$

This same condition would occur in the event of a null driving error input signal to both valves and a positive hard-over failure of the second valve 12. Hence, it is apparent that unwanted motion of the actuator piston 3 occurs when a fluid flow unbalance existing between $q_1$ and $q_2$ causes the fluid flow integrator piston 17 to move. However, motion of actuator piston 3 in response to balanced fluid power application does not produce motion of the flow integrator piston 17:

$$q_d = q_1 - q_2 = 0, \text{ when } q_1 = q_2 \qquad (13)$$

It is undesirable, of course, to suffer actuator piston motion concurrent with flow integrator piston motion due solely to conditions of fluid power unbalance existing between the two transfer valves. This undesirable condition may be attenuated in practice by constructing the fluid flow integrator assembly with a much smaller effective cross-sectional area for the integrator assembly. Thus, for a given differential volumetric flow rate, the integrator piston will move much faster than the actuator piston. In a given interval of time, the integrator piston in FIG. 2 will suffer a larger excursion, causing the integrator pickoff 23 to transmit a large bias signal to each of the control valve summing networks 7 and 13. These signals result in synchronizing the dual flow. In other words, the flow from each valve is caused to match the other in response to the bias signals from the flow integrator.

It is to be noted that the incremental errow flow $\Delta q_a$ in the actuator cylinder after flow synchronization takes place is unchanged from that which results from the initial occurrence of a finite step bias at one valve: An initial flow bias at, say, the first valve ($\Delta q_{1_0}$) results in half that flow rate into the first chamber of the differential flow integrator and the other half of that flow rate through the actuator ($\Delta q_a = \frac{1}{2}\Delta q_{1_0}$) into a second chamber of the differential flow integrator. Upon dual flow synchronization in response to the output signals from the flow integrator to both valves, the net bias flow at the first valve is reduced to one-half its initial magnitude and the zero error flow at the second valve is increased to one-half the initial bias value at the first valve, such that the synchronized flow at each valve is equal to the other in magnitude and sense (tending to move the actuator in a common direction). In the absence of a system command input and neglecting the effect of the actuator position feedback loop, no flow now occurs in the differential flow integrator because the differential flow is zero in the synchronized flow condition, and the bias flow now occurs between the valves through the actuator. Hence, the actuator error flow is equal to one-half the initial flow bias, as before: ($\Delta q_a = q_{1_1} = q_{2_1} = \frac{1}{2} q_{1_0}$). In other words, neglecting the position feedback loop response, $\Delta q_a$ always equals the actuator error flow initially caused by the occurrence of a finite flow bias.

If the excursions of the flow integrator piston 20 were to cause the spool 18 to "bottom" or reach its travel limit, then full compensation of the differential flow could not occur from the action of the flow integrator 15 alone. However, the action of the voltage integrator 24 in FIG. 2 tends to reduce the displacement of the flow integrator piston by supplementing the dual flow synchronizing signal from the flow integrator. The existence of a finite output from the flow integrator, corresponding to a finite displacement of the integrator piston from a null position, causes the output of the voltage integrator to vary in a manner indicative of the time integral of the displacement of the flow integrator piston. The output of the voltage integrator, as an additional input signal to the valves 6 and 12, not only aids in the reduction of differential flow, but also causes an interim change in differential flow which tends to "center" or reduce displacement of the flow integrator piston. In other words, the action of the flow integrator, either with or without the aid of the voltage integrator, tends to result in zero rate of flow integrator piston motion which is indicative of zero differential flow between the valves, while the action of the voltage integrator also tends to limit the steady state displacement of the flow integrator piston.

Consider, now, the further operational relationship between the flow synchronization function and the actuator position control loop for the embodiment described in FIG. 2. Any difference between the first channel and second channel input levels and gains can be viewed analogously as a flow bias applied to one channel of an otherwise symmetrical dual channel system. Assuming the absence of command signals and the presence of an unbalance in the magnitude of $q_1$ and $q_2$ caused by a positive fluid power bias in valve 6, a differential fluid flow, $q_d$, will occur in the direction indicated by the arrows in FIG. 3 moving flow integrator piston 17 to the right. The resulting output signal from the flow integrator (and voltage integrator) will produce a negative bias at summing network 7 as to cause the valve spool of valve 6 to move in a negative direction (to the left in FIG. 3) as to reduce the flow through the valve and thereby tending to compensate for the pre-existing positive flow bias. Concurrently the output signal from the flow integrator fed to the summing network 13 of the second channel will further compensate the difference in flow between the first and second channels, by causing the valve spool of valve 12 to move in a positive direction (to the right in FIG. 3), resulting in fluid flow toward valve 12 from the second chamber 11 of the actuator cylinder. In other words, an incremental value of negative flow sense results at valve 6 ($-\Delta q_1$), while an incremental value of positive flow sense results at valve 12 ($+\Delta q_2$), such that the difference between $q_1$ and $q_2$ approaches zero. The incremental value of $q_a$ which results from the initial bias is always present, however, and represents an error flow in the actuator and hence an error in the actuator piston motion, which causes a change in the feedback signals fed by the actuator position pickoffs to the summing networks. Thus, the function of the actuator feedback loop is to zero $q_a$ and hence to zero the actuator rate of motion, while the function of the flow integrator (and voltage integrator) is to synchronize the dual flow in the pair of electrohydraulic valves. However, the steady-state position of the actuator will be determined by the actuator position feedback loop response to the system inputs including the bias input to valve 6.

The dual flow synchronized electrohydraulic actuator system as described has been conceived as applicable for, although not restricted in application to, aircraft automatic flight controls such as stability augmentation systems. For such application, several additional modes of failure are pertinent to a description of the operation of the device.

A drift failure is deferred as a bias or asymmetry which increases as a function of time. Should a slow drift failure occur in any component leading up to and including one of the electrohydraulic valves, the response of the aircraft automatic attitude computer or guidance system and, to a lesser extent, the aircraft stability augmentation system in which the actuator system is employed will counteract the effects of this failure on the attitude of the aircraft. Essentially, the net effect will be equal and opposite flow commands superimposed on the flow commands normally appearing at the electrohydraulic valves. Since the superimposed commands constitute an unbalance condition, they are cancelled by the synchronizing commands of the voltage integrator as previously described.

The drift may continue, the equal and opposite superimposed flow commands being followed and cancelled by the synchronizing commands, until the saturation level of the voltage integrator 24 is reached. At this point, the unbalanced flow condition will be allowed and will continue until the flow integrator spool 18 bottoms and the flows, $q_d$, become zero. As the drift continues the equal and opposite flow commands appearing at the electrohydraulic valves 6 and 12 will move the power stage spools in FIG. 3 in opposite directions thus opening both actuator control chambers similarly to either the supply pressure chamber or the return pressure chamber of each valve. Either both power stage spools will move in opposite directions from their center positions, or, if both happen to be off to the same side of center, only one will pass through its center position. In either case the flows $q_1$, $q_a$ and $q_2$ will eventually become zero and no additional actuator motion will be possible.

If deemed necessary or desirable, the flow integrator can also act as part of the failure monitor by incorporating limit switches within the flow integrator device whereby such limit switches are activated upon the bottoming of the spool 18, and made to cooperate with a time delay circuit to distinguish between a failure or a large but permissible unbalance between the two control channels leading up to the electrohydraulic valves: Should the bottoming duration exceed a preset time, the entire actuator system would automatically shut down. One the other hand, should the preset time prove to be sufficiently long to allow the voltage integrator 24 to drive the spool 18 toward its center position, thus preventing shutdown of the servo, the system would again continue to operate in the normal manner.

Should a fast drift failure occur in any component leading up to and including one of the electrohydraulic valves, the automatic nature of the attitude computer, and to a larger extent, the stability augmentation system of the controlled aircraft will, as in the above case, counteract the effects of this failure. However, because of the higher drift rate the voltage integrator output voltage may not increase fast enough to prevent the drift failure from bottoming the flow integrator spool. Actually, depending on the drift rate, the flow integrator spool may bottom long before the voltage integrator output is saturated. Upon bottoming, the system acts as described above.

In the case of a sudden "hardover" failure, the fail safe characteristics are similar to the case of a fast drift failure so long as the failed component does not include a servo current amplifier or electrohydraulic valve. Should a hardover failure occur in a servo current amplifier or electrohydraulic valve, the failed component will effectively block all signals applied to the corresponding channel of the actuator system and only the maximum hardover signal will prevail. On the other hand, the opposite, properly operating channel will pass all signals applied to it.

Assume that a sudden hardover failure occurs in the valve 6 of the first channel, shifting the power stage spool to the extreme right hand position. Initially $q_2$ will have a value which for simplicity can be assumed to be zero and $q_1$ will take a value which is the maximum value, by definition of the failure. Thus, initially, $q_a$ and $q_d$ will be equal to half of $q_1$, causing both the actuator piston 3 to move to the right and flow integrator piston 17 to move to the right at half their maximum rates. However, the volume displacement of the flow integrator is small, its area and travel being small, allowing a negligible displacement of the actuator piston 3 over a short interval of time before the flow integrator spool 18 bottoms. As the flow integrator spool 18 bottoms, the flow integrator position transducer 23 and actuator position transducers 8 and 14 will command left and right displacements respectively on the valve spool of the valve 12 in FIG. 3. Also at this point, $q_d$ will become zero and $q_a$, following a slight delay due to fluid compressibility effects, also will become zero. The compression process allows the actuator piston to move still farther to the right and causes the actuator position pickoff 14 to command the power stage spool of the second valve 12 to move slightly to the right in FIG. 3. Up to this time, the voltage integrator 24 will have integrated the output voltage of the flow integrator 15, thus commanding the valve spool of valve 12 to move continuously to the left in FIG. 3. Eventually the valve spool will pass through center from right to left and flow $q_a$ will again be admitted in the positive direction (as shown by the arrow in FIG. 3). Since this flow can only come from valve 6 in the first channel and through the actuator toward valve 12, it will cause the actuator piston 3 to move with an increasing rate still farther to the right until the shutdown of the actuator system is initiated.

In general, the maximum displacement of the actuator due to any type of failure is a function of the gain of the voltage integrator 24 and the duration in which it is allowed to operate prior to the shutdown of the actuator system by a failure monitor. Conceivably the entire motion of the actuator piston 3 from the time of failure to the time the shutdown of the actuator system is initiated can be made a small percentage of the maximum travel of the actuator piston.

Since any difference between the first channel and second channel input levels and gains can be viewed analogously as a bias error applied to one channel of an otherwise symmetrical dual channel system, the net effect of the flow integrator upon the dual channel actuator is to electrically rebalance the actuator flow bias. Such performance feature also provides system self-centering upon initial installation and operation of the dual channel actuator, without the need of tedious and time-consuming valve-rigging and alignment procedures. Further, such self-nulling feature of the dual valves of the dual channel actuator configuration enables the system to employ, or to suffer, wider gain tolerances in the system components (i.e., a wide range of asymmetry) than with other types of dual channel actuators which provide only pressure synchronization means. Also, the flow integrator device does not display the varying time-lag inherent in all pressure synchronizing systems for sensed pressure relative to fluid flow. The larger excursions associated with the transducer element of the flow integrator, as distinguished from that for a diaphragm type pressure transducer, better allows manufacturing control of gain tolerances and non-linearities in the output. Further, the flow integrator displays lower threshold and greater linearity of response, relative to piston-type pressure transducers, due to the absence of seals in the flow integrator.

It will be seen that the device of this invention provides improved and reliable means for achieving fail-safety in a fluid actuator servo system.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A dual tandem fluid actuator having a single output member; first and second valve means for controlling fluid flow to and from said fluid actuator, means responsive to actuator position output for providing a negative position feedback signal to said valve means for servo control of actuator position output; and integrating means responsive to fluid flow through said valve means for providing an output signal representing the time integral of the difference between the fluid flow through each said valve means, said valve means being responsively connected to said integrating means, whereby said integrating means cooperates with said valve means to reduce difference between flow through said valves.

2. The structure of claim 1 wherein said integrating means comprises a cylinder having a piston therein dividing the cylinder into first and second intermediate chambers, means providing first and second end chambers adjacent respective ones of said first and second intermediate chambers, a spool carrying said piston, said spool having respective end sections thereof terminating in said first and second end chambers respectively, conduit means for coupling said first end chamber and said first intermediate chamber to said first and second valve means respectively, second conduit means for coupling said second end chamber and said second intermediate chamber to a source of fluid supply and return respectively, and means for sensing motion of said piston relative to said cylinder to provide said integrating means output.

3. The structure of claim 2 including a voltage integrator responsive to said output signal, and a connection from said voltage integrator to said valve means.

4. A dual channel fluid actuator having a single output member; first and second valve means for controlling fluid flow to and from said fluid actuator, said valve means being connected to communicate in fluid circuit with said actuator; means responsive to actuator position output for providing a negative position feedback signal to said valve means for servo control of actuator position output; integrating means for providing an output signal representing the time integral of the difference betwen the fluid flow through each of said first and second valve means for controlling fluid flow, said integrating means responsively connected in fluid circuit between each said valve means and said actuator, and said valve means responsively connected to said negative position feedback means and to said integrating means, whereby said integrating means cooperates with said valve means to provide and maintain self-centering of said actuator, and to reduce the differences in flow between said valves.

5. The device claimed in claim 4 wherein the integrating means comprises a cylinder, a movable piston and connecting spool mounted in said cylinder, said spool oriented along the longitudinal axis of said cylinder and extending beyond either side of said piston; said cylinder having first and second transverse partitions cooperating with said piston to form first and second flow chambers on either side of said piston; third and fourth flow chambers formed between the ends of said cylinder and said spool; said spool cross sectional areas and effective piston areas of said piston being equal; said first and third chambers being responsively connected to first and second transfer valves between which the integral of differential flow is desired, said second and fourth chambers being connected to a return line and pressure line respectively of a closed hydraulic pressure fluid source; transducer means responsive to the relative motion between said piston and said cylinder for providing an electric output signal having a magnitude proportional to the time integral of the fluid flow into and out of said first and third chambers.

6. A dual channel electrohydraulic servo comprising a single cylinder connected to a support, a single movable piston mounted in said cylinder and connected to a single output member; first and second three-way electric transfer valves for controlling fluid flow to and from first and second cylinder chambers respectively, one on either end of said piston; first and second pickoff devices responsive to the relative motion between said output member and said cylinder for providing a negative position feedback control signal to said first and second electric transfer valves, respectively; a differential flow integration transducer responsively connected in fluid circuit between said first and second electric transfer valves respectively; and first and second electric transfer valves being responsively connected in electric circuit to receive a summation of electric signals including a command signal, actuator position feedback signal and flow integration transducer signal, the electrical sense connections of said second transfer valve being relative to said first transfer valve whereby said second valve cooperates with said first transfer valve to induce output member motion in a common direction in response to a common system input command signal, and to reduce differences in flow between said valves.

7. A hydraulic flow integration transducer comprising a cylinder; a movable piston and connecting spool mounted in said cylinder, said spool oriented along the longitudinal axis of said piston and extending beyond either side of said piston; first and second flow chambers formed between either face of said piston and an associated end of said cylinder; third and fourth flow chambers formed about said ends of said cylinder and enclosing associated terminal cross-sectional area of said spool; said spool cross sectional areas and effective piston areas of said piston being equal; said first and third chambers being responsively connected to first and second hydraulic flow lines respectively between which a measure of the integral of differential flow is desired, said second and fourth chambers being connected to a return line and pressure line respectively of a closed hydraulic pressure fluid source; transducer means responsive to the relative motion between said piston and said cylinder, whereby an electric output signal is generated having a magnitude proportional to the time integral of the fluid flow into and out of said first and third chambers.

8. In a dual channel fluid control system having a pair of electric control valves a fluid flow integrating means comprising a cylinder having a pair of transverse partitions dividing the interior thereof into three axially spaced chambers including first and second end chambers and a third central chamber, a spool in said cylinder extending through both said partitions and terminating in said first and second chambers respectively, a piston affixed to said spool and situated within said central chamber, said piston dividing said central chamber into first and second intermediate chambers, said first end chamber and first intermediate chamber being connected with said first and second valves respectively between which a measure of the time integral of differential flow is desired, said second end chamber and second intermediate chamber being connected with a return line and pressure line respectively of a closed fluid pressure source common to said dual channel system, the effective hydraulic areas of said spool and piston presented to each of said chambers being equal to each other, transducer means responsive to the relative motion between said piston and said cylinder whereby an electric output signal is generated which is indicative of the time integral of the fluid flow into and out of both said first end chamber and first intermediate chamber.

9. A fluid flow integrating means for use in a dual channel fluid control system having a pair of three-way electric control valve means; comprising a cylinder having a pair of transverse partitions dividing the interior thereof into three axially spaced chambers including first and second end chambers and a third central chamber, a spool in said cylinder extending through both said partitions and terminating in said first and second chambers respectively, a piston affixed to said spool and situated within said central intermediate chamber, said piston dividing said central intermediate chamber into first and second intermediate chambers, said first intermediate chamber being adjacent to said first chamber, said first and first intermediate chambers being connected to first and second valves respectively between which a measure of the time integral of differential flow is desired, said second and second intermediate chambers being connected to a return line and pressure line respectively of a closed fluid pressure source common to said dual channel system, the effective hydraulic areas of said spool and piston presented to each of said chambers being equal to each other, transducer means responsive to the relative motion between said piston and said cylinder whereby an electric output signal is generated which is indicative of the time integral of the fluid flow into and out of both said first and first intermediate chambers.

10. A fluid flow integrating means comprising a cylinder having a pair of transverse partitions dividing the interior thereof into three axially spaced chambers including first and second end chambers and a third central chamber, a spool in said cylinder extending through both said partitions and terminating in said first and second chambers respectively, a piston affixed to said spool and situated within said central chamber, said piston dividing said central chambers into first and second intermediate chambers, the effective hydraulic areas of said spool and piston presented to each of said chambers being equal to each other, transducer means responsive to the relative motion between said piston and said cylinder for generating an electric output signal indicative of the time integral of the fluid flow into and out of both said first end chamber and said first intermediate chamber.

11. The device claimed in claim 10 wherein the cylinder consists of a material of relatively low magnetic permeability, and the pickoff is an A.-C. inductive pickoff comprising a magnetically permeable and symmetrically shaped plug mounted upon said spool and situate within the second intermediate chamber, a primary winding and secondary winding externally concentric with said fixed to said cylinder about said intermediate chamber and concentric with each other, said secondary winding consisting of two half-sections, axially spaced relative to and proximately contiguous with each other, each said half-section being oppositely connected in electrical series circuit with the other, such that a common flux change will induce symmetrical and opposing voltages in each half section relative to the other, resulting in a zero net electrical potential across such secondary winding and whereby relative changes in flux coupling between each half section and said primary winding due to motion of said spool and slug causes an induced voltage across said secondary winding which is indicative of the position of said spool.

12. The device claimed in claim 10 wherein the spool consists of two axial sections, one of which is affixed to the piston, and each of which extends through one of the pair of transverse partitions, a cylindrical spacer also having a diameter less than that of the cylinder and greater than that of said axial sections of said spool, said cylindrical spacer being situate in said intermediate chamber between said axial sections.

13. The device claimed in claim 10 wherein the spool consists of a first axial section affixed to said piston and extending through one of said transverse partitions, a second axial section extending through the second transverse partition, and a cylindrical spacer slidably mounted in said intermediate chamber and situate between said axial sections.

14. The device claimed in claim 10 wherein the spool consists of a first axial section affixed to said piston and extending through one of said transverse partitions, a second axial section extending through the second transverse partition, a magnetically permeable cylindrical spacer slidably mounted in said intermediate chamber and situate between said axial sections, and wherein the cylinder consists of a material of relatively low magnetic permeability, and the pickoff is an A.-C. inductive pickoff comprising said magnetically permeable and cylindrical spacer slidably mounted upon said spool and situate within the second intermediate chamber, a primary winding and secondary winding externally concentric with and fixed to said cylinder about said intermediate chamber and concentric with each other, said secondary winding consisting of two half-sections, axially spaced relative to and proximately contiguous with each other, each said half section being oppositely connected in electrical series circuit with the other, such that a common flux change will induce symmetrical and opposing voltages in each half section relative to the other, resulting in a zero net electrical potential across such secondary winding and whereby relative changes in flux coupling between each half section and said primary winding due to motion of said spool and slug causes an induced voltage across said secondary winding which is indicative of the position of said spool.

15. A dual channel fluid power servo system comprising a fluid actuator having a cylinder and piston therein, first and second valve means for controlling fluid flow to and from said cylinder at opposite sides of said piston respectively, feedback means responsive to relative motion of said piston and cylinder for controlling said valve means, and means responsive to a difference in rates of flow through said first and second valve means for modifying the control of said valve means from said feedback means.

16. A dual channel fluid power servo system comprising a fluid actuator having a cylinder and piston therein, first and second valve means for controlling fluid flow to and from said cylinder at opposite sides of said piston respectively, said system being arranged so that one of said valve means will cause flow to said actuator when the other of said valve means causes flow from said actuator and means for equalizing the flow through each of said valve means relative to the other.

17. A dual channel fluid power servo system comprising a fluid actuator, first and second valve means for controlling fluid flow to and from said actuator, feedback means responsive to said actuator for controlling said valve means, and control means responsive to differences in rates of flow through said first and second valve means for modifying the control of said valve means from said feedback means.

18. The structure of claim 17 wherein said control means comprises a cylinder having a piston therein dividing the cylinder into first and second intermediate chambers, means providing first and second end chambers adjacent respective ones of said first and second intermediate chambers, a spool carrying said piston, said spool having respective end sections thereof terminating in said first and second end chambers respectively, conduit means for coupling said first end chamber and said first intermediate chamber to said first and second valve means respectively, second conduit means respectively, second conduit means for coupling said second end chamber and said second intermediate chamber to a source of fluid supply and return respectively, and means for sensing motion of said piston relative to said cylinder to provide an output.

19. A dual channel electrohydraulic servo comprising a single cylinder connected to a support, a single movable piston mounted in said cylinder and connected to a single output member; first and second three-way electric transfer valves for controlling fluid flow to and from first and second cylinder chambers respectively, one on either end of said piston; first and second pickoff devices responsive to the relative motion between said output member and said cylinder for providing a negative position feedback control signal to said first and second electric transfer valves, respectively; a differential flow integration transducer responsively connected in fluid circuit between said first and second electric transfer valves; a voltage integrator responsively connected in circuit with said differential flow integration transducer; first and second cylinder chambers being responsively connected in fluid circuit to said first and second transfer valves respectively; said first and second electric transfer valves being responsively connected in electric circuit to receive a summation of electric signals including a command signal, actuator position feedback signal, voltage integrator signal and flow integration transducer signal, the electrical sense connections of said second transfer valve being relative to said first transfer valve whereby said second valve cooperates with said first transfer valve to induce output member motion in a common direction in response to a common system input command signal, and to reduce output member motion in response to the presence of a bias signal at either of both said valves, and whereby said voltage integrator resists saturation of said differential flow transducer.

References Cited in the file of this patent

UNITED STATES PATENTS

| | | |
|---|---|---|
| 2,278,396 | Saur | Mar. 31, 1942 |
| 2,722,198 | Macgeorge | Nov. 1, 1955 |
| 2,766,731 | Brandes et al. | Oct. 16, 1956 |
| 2,961,203 | Hutchinson et al. | Nov. 22, 1960 |